US012498679B2

(12) United States Patent
Li et al.

(10) Patent No.: US 12,498,679 B2
(45) Date of Patent: Dec. 16, 2025

(54) DEVICE, COMPUTER-IMPLEMENTED METHOD OF ACTIVE LEARNING FOR OPERATING A PHYSICAL SYSTEM

(71) Applicant: Robert Bosch GmbH, Stuttgart (DE)

(72) Inventors: Cen-You Li, Stuttgart (DE); Barbara Rakitsch, Stuttgart (DE); Christoph Zimmer, Korntal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 520 days.

(21) Appl. No.: 18/163,433

(22) Filed: Feb. 2, 2023

(65) Prior Publication Data

US 2023/0259076 A1 Aug. 17, 2023

(30) Foreign Application Priority Data

Feb. 11, 2022 (DE) ...................... 10 2022 201 453.7

(51) Int. Cl.
*G05B 13/02* (2006.01)
*G05B 13/04* (2006.01)
*G06N 7/00* (2023.01)
*G06N 20/00* (2019.01)

(52) U.S. Cl.
CPC ....... *G05B 13/0265* (2013.01); *G05B 13/048* (2013.01); *G06N 7/00* (2013.01); *G06N 20/00* (2019.01)

(58) Field of Classification Search
CPC ........ G06N 7/00; G06N 20/00; G06F 18/258; G05B 13/02

USPC .......................................................... 700/44
See application file for complete search history.

(56) References Cited

U.S. PATENT DOCUMENTS

| | | | | |
|---|---|---|---|---|
| 9,858,529 B2* | 1/2018 | Adams | .................... | G06N 5/048 |
| 9,864,953 B2* | 1/2018 | Adams | ..................... | G06N 7/01 |
| 11,514,268 B2* | 11/2022 | Zimmer | ................ | G06F 18/217 |
| 2014/0358831 A1* | 12/2014 | Adams | ..................... | G06N 7/01 |
| | | | | 706/20 |

(Continued)

OTHER PUBLICATIONS

Zimmer et al., "Safe Active Learning for Time-Series Modeling With Gaussian Processes," 32nd Conference on Neural Information Processing Systems (NEURIPS 2018), Montreal, Canada, 2018, pp. 1-10.

(Continued)

*Primary Examiner* — Ronald D Hartman, Jr.
(74) *Attorney, Agent, or Firm* — NORTON ROSE FULBRIGHT US LLP

(57) ABSTRACT

Active learning for operating a physical system. The method includes: providing a data set that comprises data points each comprising an input for operating the physical system, and a first and second observation of the physical system; training a multi-output Gaussian process for predicting the first observation for a given input with the data set; training a Gaussian process for predicting the second observation for a given input with the data set; determining with the data set an input for operating the physical system; determining the first and second observations that result from operating the physical system with the determined input; and adding a data point to the data set that comprises the determined input and the determined first and second observations.

14 Claims, 2 Drawing Sheets

(56) References Cited

U.S. PATENT DOCUMENTS

2021/0319308 A1* 10/2021 Sankaranarayanan ... G06N 3/04
2021/0357787 A1* 11/2021 Schiegg ................. G06N 20/00

OTHER PUBLICATIONS

Liu et al., "Remarks on Multi-Output Gaussian Process Regression," Knowledge-Based Systems, vol. 144, 2018, pp. 102-121.
Minka, "Expectation Propagation for Approximate Bayesian Inference," UAI'01: Proceedings of the Seventeenth Conference on Uncertainty in Artificial Intelligence, 2001, pp. 362-369. <https://dl.acm.org/doi/pdf/10.5555/2074022.2074067> Downloaded Feb. 2, 2023.

* cited by examiner

DEVICE, COMPUTER-IMPLEMENTED METHOD OF ACTIVE LEARNING FOR OPERATING A PHYSICAL SYSTEM

CROSS REFERENCE

The present application claims the benefit under 35 U.S.C. § 119 of German Patent Application No. DE 10 2022 201 453.7 filed on Feb. 11, 2022, which is expressly incorporated herein by reference in its entirety.

FIELD

The present invention concerns a device and a computer-implemented method of active learning in particular for operating a physical system.

SUMMARY

According to an example embodiment of the present invention, a computer-implemented method of active learning in particular for operating a physical system comprises providing a data set that comprises data points, wherein each data point comprises an input for operating the physical system and a first observation and a second observation of the physical system, training a multi-output Gaussian process for predicting the first observation for a given input with the data set, training a Gaussian process for predicting the second observation for a given input with the data set, determining with the data set an input for operating the physical system for that an information gain or uncertainty about an operation of the physical system when operating the physical system with the input is larger than for at least one other input and for that a probability that the Gaussian process predicts a second observation that meets a condition exceeds a threshold, determining, in particular measuring, the first observation and the second observation that result from operating the physical system the determined input and adding a data point to the data set that comprises the determined input and the determined first observation and the determined second observation. This method provides safe active learning.

Determining the input preferably comprises determining the input to be different than inputs that the data points in the data set comprise. This avoids using redundant measurements and thus saves cost related to measuring data.

Determining the input may comprise sampling the input from possible inputs for the physical system. The possible inputs define the set of values that are useful for evaluating.

According to an example embodiment of the present invention, the method may comprise determining the input with an acquisition function that is defined depending on the input and the data set. This allows to evaluate the input based on already measured inputs and the observations that correspond to these inputs. This improves the safe active learning in a way that the already measured data helps predict what new inputs are useful, and thus improve the efficiency and save measuring cost by only measuring the seemingly informative new points.

In one example embodiment of the present invention, the acquisition function models the information gain or the uncertainty about the operation of the physical system when operating the physical system with the input, wherein the input is determined for that according to the acquisition function the information gain or uncertainty is larger than it is according to the acquisition function for at least one other input. This allows selecting the input that allows faster learning as the other input.

According to an example embodiment of the present invention preferably, the condition models operating states in which the physical system likely operates safely, wherein when it is determined that the condition is met, the determined input is selected for operating the physical system and/or that the condition models operating states in which the physical system likely operates unsafely, wherein when it is determined that the condition is not met, the determined input is not selected for operating the physical system. This allows selecting the input that is likely to be safe and avoids operating the physical system in an unsafe operating mode.

The method may comprise sending an instruction comprising the determined input. The method may thus be used on a back end machine for instructing the physical system when it is remote from the back end machine.

The method may comprise operating the physical system according to the instruction and measuring the first observation and the second observation that result from operating the physical system according to the instruction. The method may thus be executed at least in part on the physical system.

The method may comprise receiving the first observation and the second observation characterizing the operation of the physical system while operating it according to the instruction, or receiving operating data characterizing the operation of the physical system while operating it according to the instruction and determining the first observation and the second observation depending on the operating data. The method may thus be used on the back end machine for evaluating the physical system that is remote from the back end machine.

The physical system may be a technical system like, e.g., a computer-controlled machine, in particular a robotic system, a robot, a vehicle, a domestic appliance, a power tool, a manufacturing machine, a personal assistant or an access control system, wherein the method comprises capturing or receiving the first observation and/or the second observation or capturing operating data and determining the first observation and/or the second observation depending on the operating data.

According to an example embodiment of the present invention, the first observation and/or the second observation and/or the operating data may comprise sensor signals, in particular digital images, preferably video, radar, LiDAR, ultrasonic, motion, thermal images, or audio, or acceleration, or speed, or roll, or pitch, or steering angle, or yaw angle, torque, revolution, temperature, or corresponding synthetic data.

According to an example embodiment of the present invention, the device for operating a physical system comprises at least one processor and at least one memory, wherein the at least one memory is adapted to store a data set, wherein the at least one processor is adapted to operate the physical system according to the method. This device is capable of achieving what is described above for the method.

A computer program comprises computer readable instructions, that, when executed by the computer, cause the computer to execute the method according to the present invention.

Further advantageous embodiments are apparent from the following description and the figures.

DETAILED DESCRIPTION OF EXAMPLE EMBODIMENTS

Figure 1:
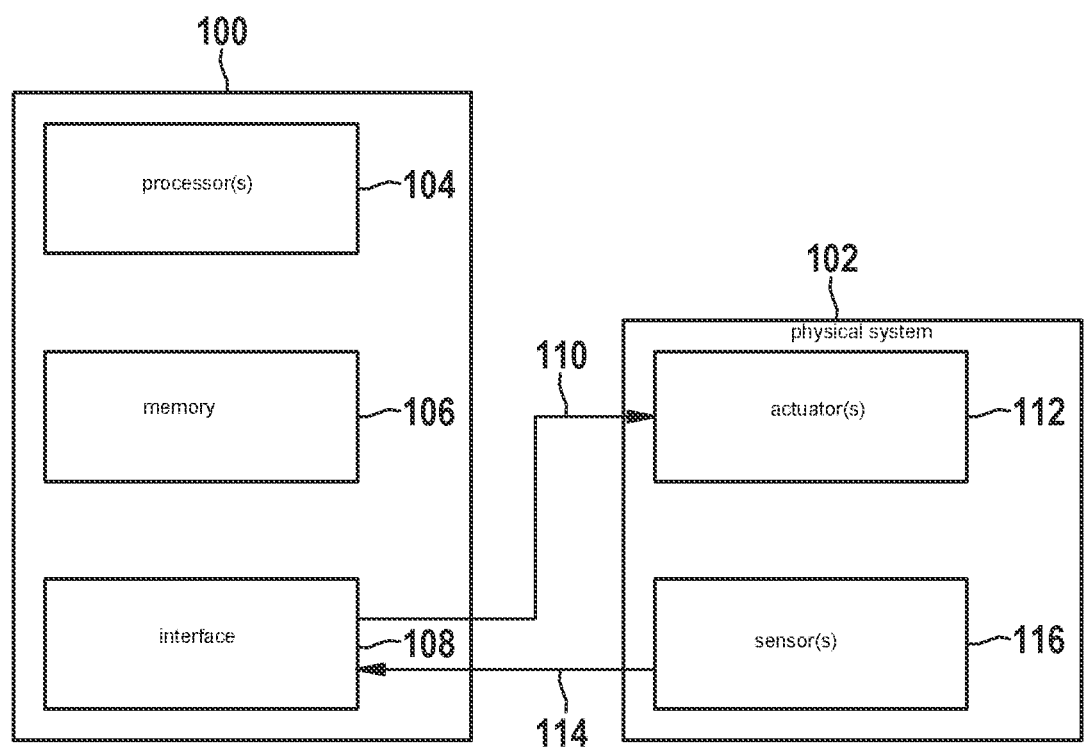
FIG. 1 schematically depicts a device for operating a physical system and the physical system, according to an example embodiment of the present invention.

FIG. 1 schematically depicts a device 100 for operating a physical system 102.

The physical system 102 may be a computer-controlled machine, like a robot, a vehicle, a domestic appliance, a power tool, a manufacturing machine, a personal assistant an engine, in particular an internal combustion or electric engine, or an access control system.

The device 100 comprises at least one processor 104 and at least one memory 106.

The at least one memory 106 is adapted to store a data set.

The at least one processor 104 is adapted to perform steps in a method to operate the physical system 102 that is described below.

The device 100 is adapted to be trained for operating the physical system 102 depending on at least a part of the data set. The device 100 is adapted to operate the physical system 102, in particular during and/or after training of the device 100.

The device 100 comprises an interface 108. The interface 108 is adapted to output instructions 110 for operating the physical system 102. The physical system 102 comprises at least one actuator 112. The at least one actuator 112 is adapted to execute the instructions 110.

The device 100 in the example is adapted to determine or read from the at least one memory 106 at least a part of the data set. The interface 108 is for example adapted to receive operating data 114. In the example, the physical system 102 comprises at least one sensor 116. The at least one sensor 116 is adapted to capture the operating data 114 or to capture a measurement and determine the operating data 114 from the measurement.

In the example, the device 100 is adapted to instruct the at least one actuator 112 to operate the physical system 102 in an operating mode according to the instructions 110 and return operating data 114 when operating in this operating mode. This means the device 100 is adapted to actively select the operating mode in that data is captured and/or transmitted. Selecting the operating mode allows exploring specific operating modes. This may be used to reduce the risk of operating the physical system 102 in an unsafe operating mode and reduces data traffic and wear of the physical system 102 in a test bench setup, in case only specific operating modes are selected.

According to the following description, a multi-output Gaussian process model f and a Gaussian process model h model a behavior of the physical system 102 and have an input $x_a$. The instructions 110 are determined depending on the input $x_a$. The operating data 114 comprises a first observation that is modelled by the multi-output Gaussian process model f and a second observation $z_a$ that is modelled by the Gaussian process model h. In one embodiment the second observation $z_a$ is not modeled by the multi-output Gaussian process model f. In one embodiment the second observation $z_a$ is modeled by the multi-output Gaussian process model f. This means the second observation $z_a$ may be a component of the multi-dimensional first observation $y_a$.

The first observation may be a full observation $y_a$ that is characterized in the example by operating data 114 that is observed at the same time. The first observation may be a partial observation $y_{pa}$. Partial in this context refers to observing a part of the available full observations $y_a$ at the same time, while another part is not observed at this time. An index p indicates what part of the full observation $y_a$ is observed at the same time.

In the example, the input $x_a$ characterizes a target value for operating the physical system 102.

In one example, the physical system is an engine. For operating the engine, the target value is e.g. target revolutions, target torque, and/or for an internal combustion engine, its target air mass flow.

In the example, the first observation characterizes an actual operating mode or state of the physical system 102. In the example for the engine, the first observation characterizes e.g. rounds per minute, torque, and/or for the internal combustion engine, its air mass flow and/or its emission.

In the example, the second observation $z_a$ characterizes an actual operating mode or state of the physical system 102. In the example for the engine, the second observation $z_a$ characterizes a temperature of the engine.

The Gaussian process model h models a value of the second observation $z_a$. The value of the second observation $z_a$ in the example must meet a condition in order to operate the physical system 102 safely. The second observation $z_a$ in the example corresponds to a physical quantity and in the example characterizes an actual state of the engine, e.g. its temperature.

The device 100 is in one example adapted to explore the operation of the physical system 102. The device 100 is for example adapted to select with the multi-output Gaussian process model f and the Gaussian process model h data points that shall be captured. In the example, the device 100 is adapted to output instructions 110 that correspond to the input $x_a$ for that, according to the Gaussian process model h, the physical system 102 operates safely, and for that according to the multi-output Gaussian process model f, the information gain about the operation of the physical system 102 is larger than for other input. The instructions 110 cause the physical system 102 to operate in order to observe its reaction. The instructions 110 may comprise information regarding the first observations that shall be observed. For partially observing, the instructions may be determine depending on the index p or may include the index p. The device 100 is adapted in this example to capture the operating data 114 at a plurality of data points that are selected with this multi-output Gaussian process model f and the Gaussian process model h. This device 100 may be adapted to generate training data based on the input $x_a$ and the resulting the observation $y_a$ in a fully observed case or the partial observation $y_{pa}$ in a partially observed case. In the partially observed case, the device 100 may be adapted to generate training data based on the index p. The device 100 may be adapted to train a machine learning system with the training data.

Instead of engine related sensor data, other sensor data may be used as well. The device 100 may be adapted to analyze data of the following types, which may be obtained by receiving sensor signals: digital images, e.g. video, radar, LiDAR, ultrasonic, motion, thermal images, or audio, or acceleration, or speed, or roll, or pitch, or steering angle, or yaw angle, torque, revolution, temperature or corresponding synthetic data. The device 100 may be adapted to avoid operating states of the physical system 102, in which the physical system 102 is damaged or damages its environment.

An exemplary algorithm for active learning for multi-output Gaussian processes requires as input a parameter $\delta \in (0,1]$, an initial data set $D_0$. The algorithm uses the multi-output Gaussian process model f and the Gaussian process model h.

The algorithm comprises a number I of iterations and is represented below:

$D_i = D_0$ for i=0 to I−1 do determine hyperparameters for the models f and h with the data set $D_i$, perform a prediction with the models f and h, determine the input $x_a$ with an acquisition function, measure with the determined input $x_a$ in the fully observed case or with the determined input $x_a$ and the index p in the partially observed case, the first observation, i.e. either $y_a$ for the fully observed case or $y_{pa}$ for the partially observed case, and the second observation $z_a$, add a data point comprising the determined input $x_a$ in the fully observed case or the determined input $x_a$ and the index p in the partially observed case, the first observation and the second observation $z_a$ to the data set $D_{i+1}$ for the next iteration, end for The algorithm determines models f and h and the data set $D_i$.

For the fully observed case, the acquisition function is $\alpha(\cdot) \in \mathbb{R}$ such that $x_a = \mathrm{argmax}_x \{(\alpha(x,D_i) x \in D_{Pool,i})\}$. The data set $D_{i+1}$ becomes $D_i \cup \{x_a, y_a, z_a\}$, wherein $D_{Pool,i}$ is a given data set that comprises possible inputs x that are not yet in the data set $D_i$. Preferably, the given data set $D_{Pool,i}$ comprises a plurality or all possible inputs x that the machine 102 can use to operate. The first observation $y_a$ and the second observation $z_a$ corresponding to the inputs x may or may not be given in the given data set $D_{Pool,i}$. In the example, these are not given and require the later described measuring steps in order to obtain them. In the example, once $x_a$ is determined, the input x that corresponds to this $x_a$ is removed from the given data set $D_{Pool,i}$.

In one embodiment, the given data set $D_{Pool,i}$ for the fully observed case comprises per input x also a given first observation y and a given second observation z that are assigned to the respective input x. In the example, once $x_a$ is determined, the entiry triple {x,y,z} that comprises the input x is removed from the given data set $D_{Pool,i}$.

For the partially observed case, the acquisition function is $\alpha(\cdot) \in \mathbb{R}$ such that $(x_a, p_a) = \mathrm{argmax}_{x,p} \{(\alpha(x, p, D_i) | (x,p) \in D_{Pool,i})\}$. The data point $\{x_a, y_{pa}, z_a\}$ comprises $y_{pa}$ that corresponds to $[y_a]_p$. The data set $D_{i+1}$ becomes $D_i \cup \{x_a, y_{pa}, z_a\}$.

In one embodiment, the given data set $D_{Pool,i}$ for the partially observed case comprises per input x and index p also a given partial first observation $y_p$ and a given second observation z that are assigned to the respective input x. In the example, once $x_a$ is determined, the entiry triple $\{x,y_p,z\}$ that comprises the input x and the first observation corresponding to the index p is removed from the given data set $D_{Pool,i}$.

For safely operating the physical system 102, the input $x_a$ is selected subject to $\xi(x_a) > 1 - \delta$ wherein $\xi(x_a)$ represents a probability, that the physical system 102 is operating safely with $x_a$. Safe in this context may refer to an operation of the physical system 102 that mitigates destroying or damaging the physical system 102 or any part of it. Safe in this context may refer to an operation of the physical system 102 that mitigates damaging or destroying an environment of the physical system 102 or any part of it. Safe in this context may refer to an operation of the physical system 102 that allows damaging or destroying a part of the physical system 102, e.g. in a fatigue test, while mitigating adverse effects on other parts of the physical system 102 or its environment.

In these examples, it is assumed that the physical system 102 operates safely, if the probability $\xi(x_a)$ exceeds a threshold, e.g., $1-\delta$ in particular for a small $\delta \in (0,1]$.

The corresponding $\xi(x_a)$ is determined from the model h and $\delta$ is for example given by an expert as input to the algorithm.

The acquisition function $\alpha(\cdot)$ in one example is, e.g. a predictive entropy $$\alpha(\cdot, D) = H(\cdot, D) = \frac{1}{2}\log(|\Sigma|) + \frac{1}{2}R\log(|2\pi e|)$$

In the fully observed case R=P and $\Sigma$ is a covariance of a posterior $p(f(x_*)|x_*,D)$ of the multi-output Gaussian process model $y_a = f(x_a) + \varepsilon_a = Wg(x_a) + \varepsilon_a \in \mathbb{R}^P$ with independent and identically distributed noise $[\varepsilon_a]_p \sim N(0, \sigma_p^2)$ for p=1, 2, ... P, a linear transformation $W \in \mathbb{R}^{P \times L}$, and latent Gaussian processes, GP, $g_l(\cdot) = [g(\cdot)]_l \sim GP(0, k_l(\cdot, \cdot))$ for l=1, 2, ... L, wherein P and L are finite, $k_l(\cdot, \cdot)$ is a bounded kernel function, and each element of W is bounded by a constant. Considering $f_p(\cdot) = [f(\cdot)]p$, the multi-output Gaussian processes has a zero mean and the covariance of $f_p(x)$ and $f_{p'}(x')$ is $$\sum_{l=1}^{L} W_{pl} W_{p'l} k_l(x, x') =: \eta_{p,p'}(x, x')$$

The posterior $p(f(x_*)|x_*,D)$ is a multivariate Gaussian $\mathcal{N}(\mu(x_*), \Sigma(x_*))$ of a collection of observations of the output $Y: \{y_i \in \mathbb{R}^P\}_{i=1}^N$ with mean $$\mu(x_*) = \Omega_{N*}^T \left(\Omega_{NN} + \mathrm{diag}\left(\{\sigma_i^2\}_{p=1}^P\right) \otimes I_N\right)^{-1} Y$$

and covariance $$\sum(x_*) = \Omega_{**} - \Omega_{N*}^T \left(\Omega_{NN} + \mathrm{diag}\left(\{\sigma_i^2\}_{p=1}^P\right) \otimes I_N\right)^{-1} \Omega_{N*}$$

wherein $\otimes$ is the Kronecker product, wherein $[\Omega_{**}]_{p,p'} = \eta_{p,p'}(x_*, x_*)$ $[\Omega_{N*}]_{(p-1)N+1:pN,p'} = \eta_{p,p'}(X, x_*) \in \mathbb{R}^{N \times 1}$ $[\Omega_{NN}]_{(p-1)N+1:pN,(p'-1)N+1:p'N} = \eta_{p,p'}(X,X) \in \mathbb{R}^{N \times N}$ $$Y=(y_{11},\ldots,Y_{1N},\ldots,Y_{P1},\ldots,Y_{PN})^T$$

$$X:\{X_i\}_{i=1}^N$$

$$D_i=\{x,y,z|x\in X, y\in Y, z\in Z\}$$

wherein $y_{pn}$ is the p-th component of the n-th observation, i.e. $y_{pn}=[Y_n]_p$.

In case the output is partially observed, some components are omitted. This saves measuring cost and computational cost due to smaller $\Omega$, R=1 and because $\Sigma$ is the variance of a partially observed multi-output Gaussian model $$y_{pn}=[f(x_n)+\varepsilon_n]_p=[Wg(x_n)+\varepsilon_n]_p\in\mathbb{R}$$

with mean $$\mu(X_*,p_*)=[\Omega_{N_{sum}*}]_{all,p_*}^T\hat{\Omega}_{N_{sum}N_{sum}}^{-1}Y_\Phi$$

and variance $$\sum(x_*,p_*)=\eta_{p_*,p_*}(x_*,x_*)-[\Omega_{N_{sum}*}]_{all,p_*}^T\hat{\Omega}_{N_{sum}N_{sum}}^{-1}[\Omega_{N_{sum}*}]_{all,p_*}$$

for observations of the output $$Y\Phi=\{y_{p_kn_k}\}_{k=1}^{N_{sum}}$$

wherein $\Phi$: $(p,n)\to k$ is a re-indexing bijection with $(p_k,n_k)=(\Phi^{-1}(k)$, wherein an output domain of $\Phi$ is $\mathbb{Z}\cap[-NP+N_{sum}+1, N_{sum}]$, where $\{1,\ldots,N_{sum}\}$ are the new indices of the observations, wherein $$\hat{\Omega}_{N_{sum}N_{sum}}=\Omega_{N_{sum}N_{sum}}+\text{diag}(\{\sigma_1^2\}_{k=1}^{N_1},\{\sigma_2^2\}_{k=1}^{N_2},\ldots,\{\sigma_{p_k}^2\}_{k=1}^{N_{sum}})$$

and wherein $N_p$ is a number of outputs with p-th componend observerd and $$N_{sum}=\sum_{i=1}^P N_i.$$

Notice that, in the fully observed case, $N_1=N_2=\ldots N_P$, $=N$ and $N_{sum}=PN$.

The hyperparameters of the Gaussian model h may be determined considering that h: $\mathbb{R}^D\to\mathbb{R}$ describes values $Z\subseteq\mathbb{R}$ of the physical quantity of the physical system 102, wherein h has a Gaussian process prior.

In an example, for values $X\in\mathbb{R}^D$ and $Z\in\mathbb{R}$, a predictive distribution $p(h(x_*)|x_*,X,Z)$ is used to determine whether the threshold is exceeded probabilistically considering a probability $$\xi(x):=\int_{-\infty}^{z_{max}}\mathcal{N}(z|\mu_h(x),\text{var}_h(x))dz$$

at $x\in X$ and under a condition for the value z, e.g. that the value z must not exceed a threshold $z_{max}\in Z$ for a safe operation of the physical system 102.

The threshold $Z_{max}$ is provided by an expert either from experience, domain expertise or experiments.

In an example, the predictive distribution $p(h(x_*)|x_*,X,Z)$ is used to determine whether the threshold is exceeded probabilistically considering a probability $$\xi(x):=\int_{z_{min}}^{\infty}\mathcal{N}(z|\mu_h(x),\text{var}_h(x))dz$$

at $x\in X$ and under a condition for the value z, e.g. that the value z must not be less than a threshold $Z_{min}\in Z$ for a safe operation of the physical system 102.

The threshold $Z_{min}$ is provided by an expert either from experience, domain expertise or experiments.

These examples comprise an integral of a standard normal distribution $\mathcal{N}$.

In the Gaussian process model h described above, the hyperparameters specify a mean function $m\mathbb{R}^D\to\mathbb{R}$ and a positive definite kernel function k: $\mathbb{R}^D\times\mathbb{R}^D\to\mathbb{R}$ as GP prior for the respective function. The model h is for example for the data set $D_i=\{x_i,y_i,z_i\}_{i=1}^N$ $$h\sim GP(m(\cdot),k(\cdot,\cdot)), z_i=h(x_i)+\epsilon_i, \epsilon_i\sim N(0,\sigma^2)$$

In the example of the method that is described below, the mean function m is a zero mean m≡0. The posterior, i.e. the prediction for a second observation z, for this example is $$p(h(x_*)|x_*,D)=\mathcal{N}(\mu(x_*),\text{var}(x_*))$$

wherein $$\mu(x_*)=K_N^T(K_{NN}+\sigma^2 I)^{-1}(Z_1,\ldots,Z_N)$$

$$\text{var}(x_*)=k(x_*,x_*)-K_N^T(K_{NN}+\sigma^2 I)^{-1}K_{N*}$$

wherein $K_{N*}\in\mathbb{R}^{N\times 1}$ and $K_{NN}\in\mathbb{R}^{N\times N}$ are matrices with $[K_{N*}]_i=k(x_i,x_*)$ and $[K_{NN}]_{i,j}=k(x_i,x_j)$ and I is the identity matrix of corresponding dimension N.

The prediction of the second observation z is a distribution that has the mean $\mu(x_*)$ and variance $\text{var}(x_*)$. The method may comprise using the mean $\mu(x_*)$ directly as mean noise free prediction of the second observation z at $x_*$. The method may comprise using the distribution to draw samples of the second observation z at $x_*$.

The method is applied alike to non-zero mean functions.

The input $X_i$ in the example is of dimension D. The input $X_i$ may be used as instructions 110 or mapped to the instructions 110 with a mapping. The instructions 110 may comprise the index p. A range of values of the operating data 114 in the example is proportional to a range of values of the first observation, e.g. $y_a$ or $y_{pa}$, and the second observation $z_a$. The first observation, e.g. $y_a$ or $y_{pa}$, may comprise scalar or multi-dimensional data. The second observation $z_a$ in the example is scalar. The operating data 114 may comprise the first observation, e.g. $y_a$ or $y_{pa}$, and the second observation $z_a$ The hyperparameters of the Gaussian processes described above define the respective mean or mean function and the respective kernel. For zero mean, the hyperparameters define the kernel.

Determining the hyperparameters may comprise optimizing the hyperparameters with an optimization e.g. gradient based approaches or sampling the hyperparameters, e.g. with Monte Carlo sampling or expectation propagation. Expectation propagation is for example performed according to T. P. Minka, "Expectation Propagation for Approximate Bayesian Inference," in Uncertainty in Artificial Intelligence. Morgan Kaufmann, 2001.

Figure 2:
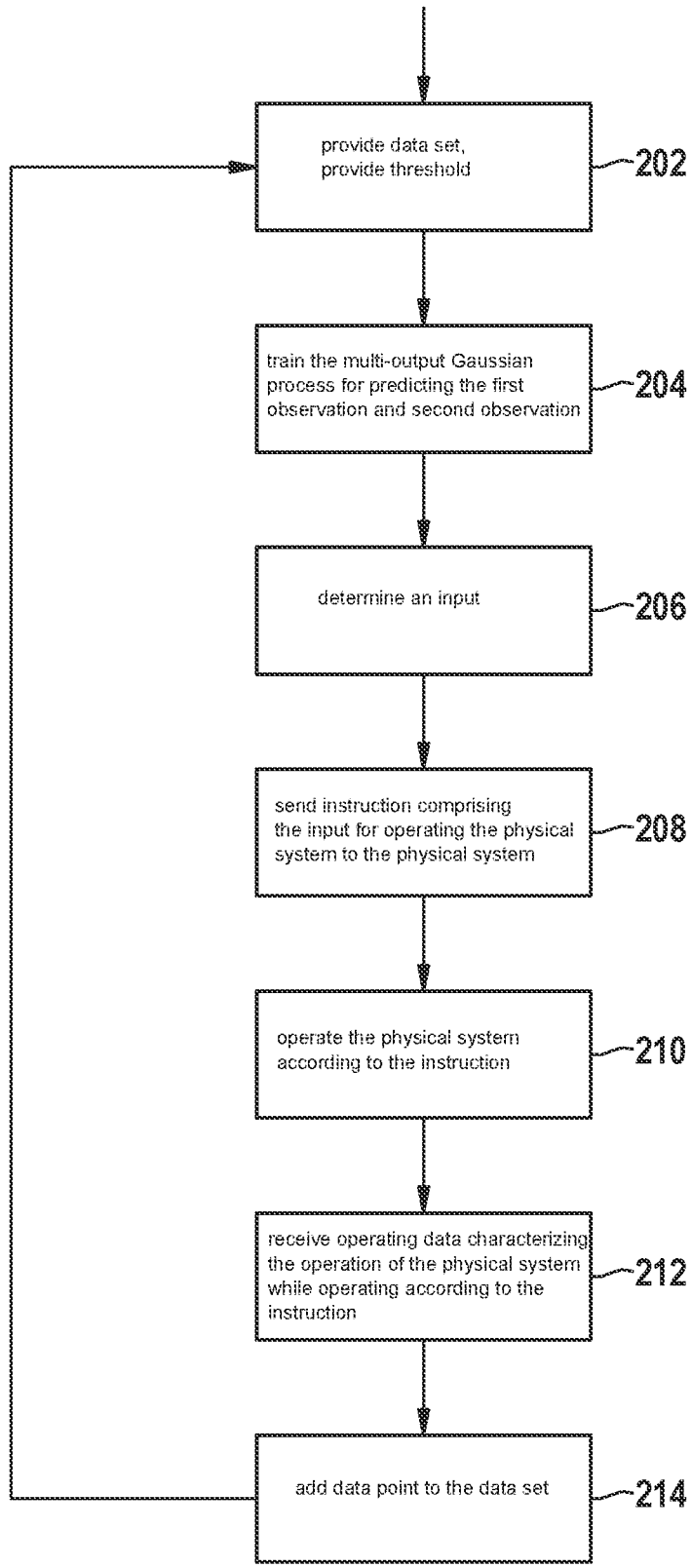
FIG. 2 depicts a flowchart of a method for operating the physical system, according to an example embodiment of the present invention.

A method of active learning in particular for operating the physical system 102 is described with reference to FIG. 2. The steps of the method are processed iteratively.

The method comprises a step 202.

The step 202 comprises providing the data set $D_i$. In a first iteration, the data set $D_i$ is initialized e.g. with $D_i=D_0$.

The step 202 comprises providing a threshold $Z_{threshold}$ that is e.g. either $z_{min}$ or $z_{max}$ as described above.

Each data point of the data set $D_i$ comprises an input x EX characterizing an instruction 110 for operating the physical system 102.

Each data point of the data set $D_i$ comprises a first observation, e.g. either $y_a \in Y$ for the fully observed case or $y_{pa} \in Y$ for the partially observed case, and a second observation $z_a \in Z$ of the physical system 102.

Afterwards, a step 204 is executed.

In the step 204, the method comprises training the multi-output Gaussian process f for predicting the first observation, e.g. either $y_a \in Y$ for the fully observed case or $y_{pa} \in Y$ for the partially observed case, depending on the given input $x_a$ with the data set $D_i$.

In the step 204, the method comprises training the Gaussian process h for predicting the second observation $z_a$ for a given input $x_a$ with the data set $D_i$.

According to an example, redundant data points of the data set $D_i$, if there are any, are considered only once. Redundant in this context means, only one data point with input $x_a$ is used, if multiple data points with the same $x_a$ exist. The data points with the same $x_a$ may comprise different second observations $z_a$.

Afterwards, a step 206 is executed.

In the step 206, the method comprises determining with the acquisition function $\alpha(\cdot)$ an input $x_a$. By design of the models, this data point that comprises the input $x_a$ has a high probability $\xi(x_a)$ that the Gaussian process h predicts a second observation $z_a$ that meets the condition for the second observation $z_a$. In the example the probability $\xi(x_a)$ exceeds the threshold $\xi(x_a) > 1-\delta$. The condition for the second observation may be determined depending on either the threshold $z_{max}$ or the threshold $z_{min}$.

The acquisition function $\alpha(\cdot)$ is defined depending on the input $x_a$ and the data set $D_i$.

In the partially observed case, the acquisition function $\alpha(\cdot)$ is used that, as described above, that depends on the input $x_a$ and the index p.

According to an example, the acquisition function $\alpha(\cdot)$ models an information gain or an uncertainty about the operation of the physical system 102. The information gain or the uncertainty may be modeled using the predicted entropy.

In an example, the input $x_a$ is selected from the given data set $D_{Pool,i}$ for that according to the acquisition function $\alpha(\cdot)$ the information gain or uncertainty is larger than it is according to the acquisition function $\alpha(\cdot)$ for another input of possible inputs for the physical system 102. Preferably, the input $x_a$ with the largest value of the acquisition function $\alpha(\cdot)$ is selected. This means the input $x_a$ maximizes the acquisition function $\alpha(\cdot)$. This means, the information gain and the uncertainty are the largest within the considered data points.

This means, selecting the input $x_a$ may comprise determining the input $x_a$ for that the acquisition function $\alpha(\cdot)$ is larger than for other inputs.

In the example, the given input x that corresponds to the selected input $x_a$ is removed from the given data set $D_{Pool,i}$.

In the fully observed case, the given data set $D_{Pool,i}$ comprises the triples described above for this case, and the triple comprising the given input x that corresponds to the selected input $x_a$ is removed from the given data set $D_{Pool,i}$.

In the partially observed case, the given data set $D_{Pool,i}$ comprises the triples described above for this case, and the triple comprising the given input x that corresponds to the selected input $x_a$ may be removed from the given data set $D_{Pool,i}$, once the first observations $y_{pa}$ that corresponds to the indices p have been added to the data set $D_i$. According to one example, the triple comprising the second observation $z_a$ comprises p first observations and is removed once the data set $D_i$ comprises p triples with all of these p first observations Afterwards, a step 208 is executed.

In the step 208, the method comprises sending the instruction 110 comprising the input $x_a$ for operating the physical system 102 to the physical system 102. In the example the instruction 110 is determined to comprise the input $x_a$.

In a step 210, the method comprises operating the physical system 102 according to the instruction 110.

The step 210 in the example comprises measuring at the physical system 102.

In the fully observed case, the method comprises in step 210 measuring at the physical system 102 the first observation $y_a$ and the second observation $z_a$ or operating data 114 corresponding to these, while operating the physical system 102 with the input $x_a$ from the selected data point.

In the partially observed case, the method comprises in step 210 measuring at the physical system 102 the first observation $y_{pa}$ and the second observation $z_a$ or operating data 114 corresponding to these while operating the physical system 102 with the input $x_a$ from the selected data point.

In the partially observed case, measuring of the same second observation $z_a$ more than once, may be avoided. For example, the method may comprise evaluating whether a measurement for the second observation $z_a$ and the input $x_a$ has already been made, and skip measuring the second observation $z_a$ while operating the machine with this input $x_a$. Alternatively, the measurement may be made. In this case, step 204 may comprise using the same second observation $z_a$ for the triples in the data set $D_i$ that result from the same input $x_a$. This avoids duplicate second observation $z_a$ in the data set $D_i$.

In a step 212, the method comprises receiving the operating data 114 characterizing the operation of the physical system 102 while operating it according to the instruction 110 that includes the input $x_a$ of the selected data point.

The step 212 may instead comprise receiving operating data 114 characterizing the operation of the physical system 102 while operating it according to the instruction 110 and determining the the first observation $y_a$ and the second observation $z_a$ or the first observation $y_{pa}$ and the second observation $z_a$ depending on the operating data 114.

Afterwards, a step 214 is executed.

In the step 214 the method comprises adding a data point to the data set $D_i$.

In the fully observed case, the data point comprises the input $x_a$ and the measured first observation $y_a$ and the measured second observation $z_a$ In the partially observed case, the resulting data point comprises the input $x_a$ and the measured first observation $y_{pa}$ and the measured second observation $z_a$.

The data set $D_i$ may be stored, e.g. as training data.

In the example, the condition models operating states in which the physical system 102 is likely to operate safely. When it is determined that the condition is met, the data point is selected for operating the physical system 102.

In one example, the condition models operating states in which the physical system 102 is likely to operate unsafely. When it is determined that the condition is not met, the data point is not selected for operating the physical system 102.

Afterwards, the step 202 is executed in a next iteration.

What is claimed is:

1. A computer-implemented method of active learning for operating a physical system, the method comprising the following steps:
providing a data set that includes data points,
wherein each of the data points includes an input for operating the physical system, and a first observation and a second observation of the physical system;
training a multi-output Gaussian process for predicting the first observation for a given input with the data set;
training a Gaussian process for predicting the second observation for a given input with the data set;
determining with the data set an input for operating the physical system so that an information gain or uncertainty about an operation of the physical system when operating the physical system with the input is larger than at least one other input, and so that a probability that the Gaussian process predicts a second observation that meets a condition exceeds a threshold;
determining, including measuring, the first observation and the second observation that result from operating the physical system with the determined input; and
adding a data point to the data set that includes the determined input and the determined first observation and the determined second observation.

2. The method according to claim 1, wherein the determining of the input includes determining the input to be different than inputs that the data points in the data set comprise.

3. The method according to claim 1, wherein the determining of the input includes sampling the input from possible inputs for the physical system.

4. The method according to claim 1, further comprising: determining the input with an acquisition function that is defined depending on the input and the data set.

5. The method according to claim 4, wherein the acquisition function models the information gain or the uncertainty about the operation of the physical system when operating the physical system with the input, wherein the input is determined for that according to the acquisition function the information gain or uncertainty is larger than it is according to the acquisition function for at least one other input.

6. The method according to claim 1, wherein: (i) the condition models operating states in which the physical system likely operates safely, wherein when it is determined that the condition is met, the determined input is selected for operating the physical system, and/or (ii) the condition models operating states in which the physical system likely operates unsafely, wherein when it is determined that the condition is not met, the determined input is not selected for operating the physical system.

7. The method according to claim 1, further comprising sending an instruction including the determined input.

8. The method according to claim 7, further comprising:
operating the physical system according to the instruction; and
measuring the first observation and the second observation that result from operating the physical system according to the instruction.

9. The method according to claim 8, further comprising:
receiving the first observation and the second observation characterizing the operation of the physical system while operating it according to the instruction.

10. The method according to claim 7, further comprising:
receiving operating data characterizing the operation of the physical system while operating it according to the instruction and determining the first observation and the second observation depending on the operating data.

11. The method according to claim 1, wherein the physical system is a computer-controlled machine or a robot or a vehicle or a domestic appliance or a power tool or a manufacturing machine or a personal assistant or an access control system, and wherein the method further comprises:
capturing or receiving the first observation and/or the second observation; or
capturing operating data and determining the first observation and/or the second observation depending on the operating data.

12. The method according to claim 10, wherein
characterized in that the first observation and/or the second observation includes sensor signals, or digital images, or video, or radar data, or LiDAR data, or ultrasonic data, or motion data, or thermal images, or audio data, or acceleration data, or speed data, or roll data, or pitch data, or steering angle data, or yaw angle data, or torque data, or revolution data, or temperature data, or corresponding synthetic data.

13. A device configured to operate a physical system, the device comprising:
at least one processor; and
at least one memory;
wherein the at least one memory is adapted to store a data set, and wherein the at least one processor is configured to operate the physical system, the at least one processor configured to:
provide the data set, the data set including data points, wherein each of the data points includes an input for operating the physical system, and a first observation and a second observation of the physical system,
train a multi-output Gaussian process for predicting the first observation for a given input with the data set,
train a Gaussian process for predicting the second observation for a given input with the data set,
determine with the data set an input for operating the physical system so that an information gain or uncertainty about an operation of the physical system when operating the physical system with the input is larger than at least one other input, and so that a probability that the Gaussian process predicts a second observation that meets a condition exceeds a threshold,
determine, including measure, the first observation and the second observation that result from operating the physical system with the determined input, and
add a data point to the data set that includes the determined input and the determined first observation and the determined second observation.

14. A non-transitory computer-readable medium on which is stored a computer program for active learning for operating a physical system, the computer program, when executed by a computer, causing the computer to perform the following steps:
providing a data set that includes data points,
wherein each of the data points includes an input for operating the physical system, and a first observation and a second observation of the physical system;

training a multi-output Gaussian process for predicting the first observation for a given input with the data set;
training a Gaussian process for predicting the second observation for a given input with the data set;
determining with the data set an input for operating the physical system so that an information gain or uncertainty about an operation of the physical system when operating the physical system with the input is larger than at least one other input, and so that a probability that the Gaussian process predicts a second observation that meets a condition exceeds a threshold;
determining, including measuring, the first observation and the second observation that result from operating the physical system with the determined input; and
adding a data point to the data set that includes the determined input and the determined first observation and the determined second observation.

* * * * *